(12) United States Patent
Gray et al.

(10) Patent No.: US 8,530,375 B2
(45) Date of Patent: Sep. 10, 2013

(54) REGENERABLE SOLID IMINE SORBENTS

(75) Inventors: McMahan Gray, Pittsburgh, PA (US); Kenneth J. Champagne, Monongahela, PA (US); Daniel Fauth, Pittsburgh, PA (US); Eric Beckman, Aspinwall, PA (US)

(73) Assignees: U.S. Department of Energy, Washington, DC (US); University of Pittsburgh—Of the Commonwealth System of Higher Education, Pittsburgh, PA (US)

( * ) Notice: Subject to any disclaimer, the term of this patent is extended or adjusted under 35 U.S.C. 154(b) by 919 days.

(21) Appl. No.: 12/549,661

(22) Filed: Aug. 28, 2009

(65) Prior Publication Data
US 2010/0292072 A1 Nov. 18, 2010

Related U.S. Application Data

(63) Continuation-in-part of application No. 11/506,120, filed on Aug. 18, 2006, now abandoned.

(51) Int. Cl.
*B01J 20/22* (2006.01)
(52) U.S. Cl.
USPC .......................................... 502/401; 502/402
(58) Field of Classification Search
USPC ................................................ 502/401, 402
See application file for complete search history.

(56) References Cited

U.S. PATENT DOCUMENTS

| | | |
|---|---|---|
| 5,492,683 A | 2/1996 | Birbara |
| 5,876,488 A | 3/1999 | Birbara |
| 6,364,938 B1 | 4/2002 | Birbara |
| 6,547,854 B1 | 4/2003 | Gray |
| 6,582,498 B1 | 6/2003 | Sass |
| 6,908,497 B1 | 6/2005 | Sirwardane |

OTHER PUBLICATIONS

Heldebrant, D. J. et al.; The Reaction of 1, 8-Diazabicyclo[5.4.0]undec-7-ene (DBU) with Carbon Dioxide, J. Org. Chem., 70, 5335-5338 (2005).
Huang, H,Y, et al.; Amine-Grafted MCM-48 and Silica Xerogel as Superior Sorbents for Acidic Gas Removal from Natural Gas, Ind. Eng. Res., 42, (12), 2427-2433 (2003).
Gray, M.L. et al.; Improved Immobilized Carbon Dioxide Capture Sorbents, Fuel Processing Technology, 86 (14), 1449-1455 (2005).
Diaf, A. and Beckman, E. J.; Thermally Reversible Polymeric Sorbents for Acid Gases, IV. Affinity Tuning for the Selective Dry Sorption of NOx, Reactive Polymers, 25 (1), 89-96 (1995).

*Primary Examiner* — Edward Johnson
(74) *Attorney, Agent, or Firm* — Bartony & Associates, LLC

(57) ABSTRACT

Two new classes of amine-based sorbents are disclosed. The first class comprises new polymer-immobilized tertiary amine sorbents; the second class new polymer-bound amine sorbents. Both classes are tailored to facilitate removal of acid anhydrides, especially carbon dioxide ($CO_2$), from effluent gases. The amines adsorb acid anhydrides in a 1:1 molar ratio. Both classes of amine sorbents adsorb in the temperature range from about 20° C. upwards to 90° C. and can be regenerated by heating upwards to 100° C.

17 Claims, 11 Drawing Sheets

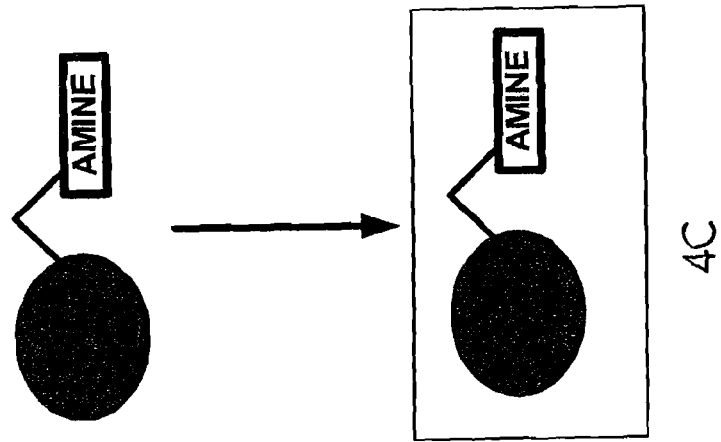
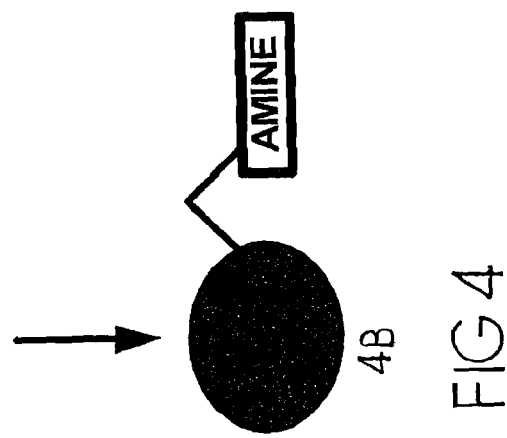
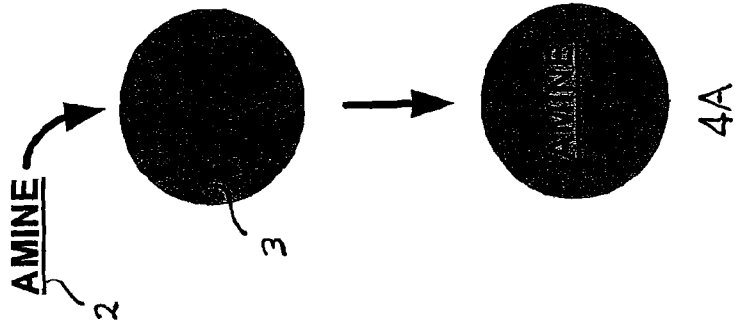
FIG 4

REGENERABLE SOLID IMINE SORBENTS

PRIORITY

This application is a continuation-in-part of U.S. Ser. No. 11/506,120 filed Aug. 18, 2006 now abandoned.

GOVERNMENT INTERESTS

This invention was made with government support pursuant to the employer-employee relationship between the Government and the inventors as U.S. Department of Energy employees at the National Energy Technology Laboratory. The government has certain rights in this invention.

BACKGROUND OF THE INVENTION

1. Field of the Invention

This invention relates to sorbents for the removal of acid anhydrides from effluent gases, and more specifically, this invention relates to two classes of amine-based sorbents: polymer-immobilized tertiary amines and polymer-bound tertiary amines which can serve as sorbents for the removal of carbon dioxide and other acid anhydrides from any effluent stream.

2. Background of the Invention

Carbon dioxide is considered to be the major greenhouse gas due to its effect on the earth's ozone layer. It has been estimated that 36% of the United States' anthropogenic $CO_2$ is produced from coal-fired power plants. Consequently, the capture and sequestration of $CO_2$ from flue gas streams is an essential step for carbon management in our environment.

New research efforts for the capture and sequestration of carbon dioxide ($CO_2$) from flue gas streams are being proposed and will have a direct or indirect impact on the types of systems ultimately designed and implemented. Currently, techniques for the capture and separation of $CO_2$ employ solvents, cryogenic techniques, membranes, and solid sorbents. Large-scale operation of these technologies is energy intensive when applied to capturing $CO_2$ in dilute streams, such as flue gas. For example, coal combustion gases comprise approximately 15 mol % $CO_2$.

Carbon dioxide is removed from natural gas streams via stripping into aqueous amine solutions. A significant improvement over the past 30 years has been the introduction of sterically hindered amines which allow for a 1:1 molar adsorption ratio of $CO_2$ to amine rather than the 1:2 ratio found in typical primary and secondary amines. The most serious drawbacks to aqueous amine processes are corrosion of process vessels, degradation of amine during thermal cycling, and the large energy requirements owing to water's high heat capacity.

Amine-based wet scrubbing systems have also been proposed as capture techniques for $CO_2$ removal from flue gas streams. However, these systems are very energy-intensive due to the large amount of water needed and the need to recover the amines via evaporation of the water. Large amounts of water are required because of the mechanism, corrosiveness, and air flow problems created by the use of monoethanolamine (MEA), diethanolamine (DEA), or methyldiethanolamine (MDEA). Also, these amines are volatile and losses can occur due to evaporation. Thus, these amines lack thermal stability.

FIG. 1 displays the reaction sequences in aqueous systems for primary and secondary amines when reacting with dissolved $CO_2$. As shown in FIG. 1, the majority of the $CO_2$ captured in liquid amine capture systems will result in the formation of a carbamate. In aqueous media, there exists a stoichiometric requirement of 2 moles (mols) of amine per mol of $CO_2$. However, the use of 1,8 Diazabicyclo-[5.4.0]-undec-7-ene (DBU), which has imine functionality ($R^1N=R^2R^3$, wherein R represents an alkyl group), can reduce the stoichiometric amount of amine required for capture of $CO_2$ to a 1:1 molar ratio, and can do so reversibly. This is shown in D. J. Heldebrant, P. G. Jessop, C. A. Thomas, C. A. Eckert, and C. L. Liotta, "The Reaction of 1,8-Diazabicyclo[5.4.0]undec-7-ene (DBU) with Carbon Dioxide," *J. Org. Chem.*, 70, 5335-5338 (2005). This 1:1 molar ratio can double the $CO_2$ loading capacity of any of the currently known $CO_2$ sorbents.

FIG. 2 displays the stoichiometry of the reaction between DBU and carbon dioxide. As noted, the presence of water is important for the formation of carbonate. This is shown in H. Y. Huang, R. T. Yang, D. Chinn, and C. L. Munson, "Amine-Grafted MCM-48 and Silica Xerogel as Superior Sorbents for Acidic Gas Removal from Natural Gas," Ind. Eng. Res., 42, (12), 2427-2433 (2003). In that work, primary amines were bonded to inert supports and absorbed 5 wt. % $CO_2$ in the presence of a 5 mol % $CO_2$ gaseous mixture. In the presence of 1 atmosphere (atm) of $CO_2$, that percentage increased to 9 wt. %. Temperature Programmed Desorption (TPD) and Mass Spectrometry (MS) analyses were also performed.

Presently, immobilized primary and secondary amine sorbents are utilized in aircraft, submarine, and spacecraft technologies. The immobilization of these amines on supports, via evaporation of the amines into the supports' pores, increases their thermal stability and thus reduces evaporation losses. Nevertheless, the cost of these sorbents is too high for large-scale applications in utility industries such as electrical generation, in part because these sorbents adsorb acid anhydrides at a 2:1 molar ratio of amine to anhydride. Also, these sorbents operate only at 25° C. and are thus limited for other applications.

Some work has been done in attempting to improve upon current sorbents' limitations by the preparation of less costly immobilized secondary amine sorbents, as reported in M. L. Gray, Y. Soong, K. J. Champagne, H. Pennline, J. P. Baltrus, R. W. Stevens, Jr., R. Khatri, S. S. C. Chuang, and T. Filburn, "Improved Immobilized Carbon Dioxide Capture Sorbents," *Fuel Processing Technology*, 86 (14), 1449-1455 (2005). While the sorbents seemed to have a stronger adsorption capability for $CO_2$, their loading capacity decreased with each adsorption/regeneration cycle.

U.S. Pat. No. 6,908,497 awarded to Sirwardane on Jun. 21, 2005 discloses carbon dioxide-specific sorbents fabricated by placing amines and/or ethers between the unit layers of an inert substrate's lattice.

U.S. Pat. No. 6,582,498 awarded to Sass, et al. on Jun. 24, 2003 discloses a method of separating carbon dioxide from a gas using a fluid dynamic instability. The method includes the use of a tertiary amine, methyldiethanolamine (MDEA).

U.S. Pat. No. 6,547,854 awarded to Gray, et al. on Apr. 15, 2003 discloses carbon dioxide-specific sorbents fabricated by chemically bonding amines to inert substrates.

U.S. Pat. Nos. 6,364,938; 5,876,488; and 5,492,683 awarded to Birbara, et al. on Apr. 2, 2002; Mar. 2, 1999; and Feb. 20, 1996, respectively, disclose carbon dioxide-specific sorbents fabricated by chemically bonding amines to inert and polymeric substrates.

None of the aforementioned patents discloses a flue gas stream sorbent which can adsorb $CO_2$ at a 1:1 molar ratio of amine to $CO_2$.

None of the aforementioned patents and articles discloses an immobilized tertiary amine-based sorbent which can adsorb carbon dioxide at temperatures in excess of 25° C.

None of the aforementioned patents and articles discloses a chemically bound tertiary amine-based sorbent which can adsorb carbon dioxide at temperatures in excess of 25° C.

In addition, none of the aforementioned patents disclose a flue gas stream sorbent for acid anhydrides which can be used in a system open to the environment.

A need exists in the art for sorbents which can adsorb $CO_2$ at higher $CO_2$ to sorbent molar ratios. A need also exists in the art for acid anhydride sorbents with greater thermal stability that can thus adsorb $CO_2$ at temperatures significantly above 25° C. Finally, a need exists in the art for acid anhydride sorbents which can be used in open systems.

SUMMARY OF THE INVENTION

It is an object of the present invention to provide sorbents for acid anhydrides in flue gases that overcomes many of the disadvantages of the prior art.

Another object of the present invention is to provide an amine-based acid anhydride sorbent with a greater temperature range for acid anhydride adsorption. A feature of the invention is that the sorbents have greater thermal stability. An advantage of the invention is greater cost-effectiveness.

Still another object of the present invention is to provide an amine-based sorbent which retains its amines at higher temperatures. A feature of this invention is that in one invented class of amines, the polymer-immobilized amines, the amines have high boiling points or are solids. Another feature is that in the other class of amine sorbents, the polymer-bound sorbents, the amine is chemically bound to the support material. An advantage of these two features is that the sorbents can be used with little or no evaporation loss of the amine. This results in lower costs.

Yet another object of the present invention is to provide an amine-based sorbent which adsorbs acid anhydrides in a 1:1 molar ratio of amine to acid anhydride. A feature of the invention is that tertiary amines are utilized in both classes of amine-based sorbents. An advantage of this feature is that a bicarbonate is formed. Another advantage is that less amine is needed to adsorb the acid anhydrides. This also results in lower costs.

Still another object of the present invention is to provide an amine-based sorbent which can be employed in environmentally open systems. A feature of this invention is that both polymer-immobilized amine sorbents and polymer bound sorbents retain their amines after exposure to anhydride. An advantage of this feature is a broader applicability of the sorbents and simpler systems for containment of the sorbents, resulting in lower costs.

Briefly, the invention provides polymer-immobilized tertiary amine-based sorbents for the adsorption of acid anhydrides in effluent gas streams.

The invention also provides polymer-bound tertiary amine-based sorbents for the adsorption of acid anhydrides in effluent gas streams.

BRIEF DESCRIPTION OF THE DRAWINGS

The invention together with the above and other objects and advantages will be best understood from the following detailed description of the preferred embodiment of the invention shown in the accompanying drawings, wherein:

FIGS. 4A-C are schematic diagrams showing the preparation of the two invented classes of amine-based sorbents, in accordance with features of the present invention;

DESCRIPTION OF INVENTION

Figure 1:
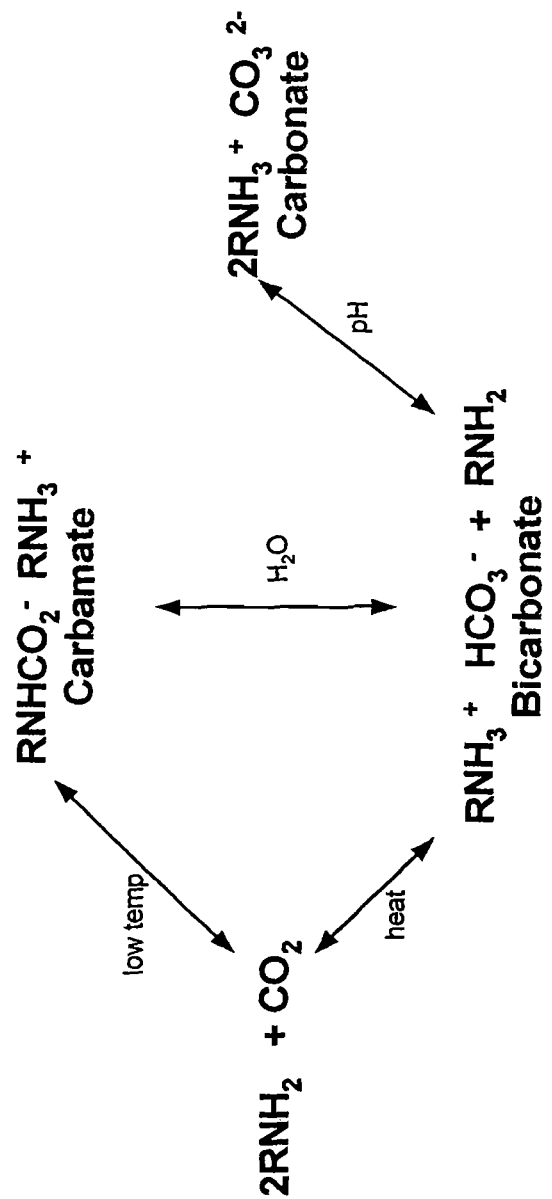
FIG. 1 is a schematic diagram of a reaction sequence for the capture of carbon dioxide by liquid amine-based sorbent systems.
Figure 2:
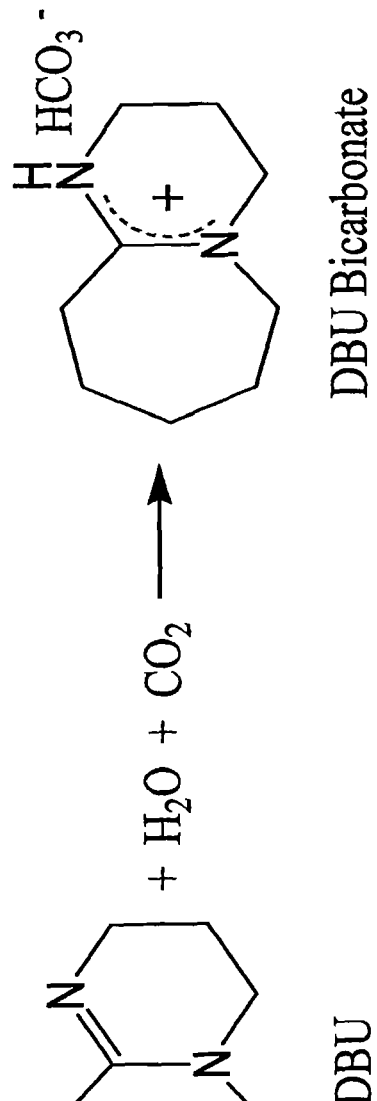
FIG. 2 is a schematic diagram of the reaction of 1,8-diazabicyclo[5.4.0]undec-7-ene (DBU) with carbon dioxide in the presence of water to form a carbamate and a bicarbonate.

The inventors have found two new classes of new amine-based sorbents for the removal of acid anhydrides from effluent gases. Target acid anhydrides, but are not limited to, $CO_2$, $SO_2$, and $NO_x$.

One class of sorbents has tertiary amines immobilized in the pores of polymer substrate supports wherein the support material to amine molar ratio is 5:1. This first class is depicted in FIG. 4A. The second class of sorbents is defined as amines chemically bonded to the surface of polymeric substrates, and thus are amine-functional polymeric sorbents. A depiction of this second class of sorbents is FIG. 4B-4C.

A salient feature of the invention is that both classes of sorbents adsorb acid anhydrides in a 1:1 molar ratio. A second salient feature is that both classes of sorbents can adsorb acid anhydrides at temperatures above 25° C., and at least as high as 85° C.

Immobilized Amine Sorbent Detail

The amines for the invented immobilized amine-based sorbents include, but are not limited to, 1,8 Diazabicyclo-[5.4.0]-undec-7-ene (DBU); 1,3,4,6,7,8-Hexahydro-2H-pyrimido[1,2,-a]pyrimidine (TBD); and N-(2-Hydroxyethyl)piperazine. As depicted in FIG. 4C, these amines, designated as element 2, are contained on a support material 3 via evaporation of the amines into the support materials' pores. The amines do not chemically react with the support material but are enclosed by the support material. The support material is a polymeric material selected from a group consisting of polyethers, polystyrenes, siloxanes, and polyacrylates, or combinations thereof. The support material can be a copolymer, e.g., styrene and chloromethyl styrene. The immobilized amines can be evenly and consistently deposited upon a support material. The molar ratio of amine in the sorbents to support material is 1:5 or about 16.7 wt. amine.

Since DBU and other tertiary amine-based sorbents have the stoichiometric capability of capturing $CO_2$ at a 1:1 molar ratio and have greater thermal stability due to higher melting and boiling points, the cost and efficiency of these tertiary amine sorbents can offer considerable improvements, and make them feasible for use in large-scale $CO_2$-generating operations. A typical flue gas stream from a power plant consists of 10-15% $CO_2$, 10-15% water, 20-50 ppm $SO_x$, 10-20 ppm $NO_x$ and air. These amines can be immobilized in the pores of polymeric supports or even chemically bound directly to the polymers, the later depicted in FIGS. 4B-C.

These tertiary amine systems can also be used for the removal of other acid anhydrides such as $SO_2$ and $NO_x$ from effluent gas streams. This has been shown with acyclic amines in A. Diaf and E. J. Beckman, "Thermally Reversible Polymeric Sorbents for Acid Gases, IV. Affinity Tuning for the Selective Dry Sorption of $NO_x$," *Reactive Polymers*, 25 (1), 89-96 (1995).

For this invention, two commercially available polymers have been used to fabricate the polymer-immobilized amine-based sorbents. These are Dialon®HP2MG, a polymethylmethylacrylate (PMMA) (Mitsubishi Chemicals, Chesapeake, Va.), and Macronet MN-200 polystyrene (Purolite, Bala Cynwyd, Pa.). Generally, the resultant surface areas (e.g. the Brunauer, Emmett and Teller surface area, or BET surface area) of the invented amine sorbents are between approximately 100 meters squared per gram ($m^2/g$) and 350 $m^2/g$. Untreated polymeric supports have BET surface areas of from about 500 $m^2/g$ to 600 $m^2/g$.

Untreated polymeric supports have typical particle sizes with diameters ranging from about 125 mesh to 130 mesh. For Macronet MN-200, the pore volume is about 1.0 mL/g and a particle size of 16 mesh to 50 mesh or between 0.3 millimeter (mm) and 1.2 mm. For Dialon® HP2MG (PMMA) the pore volume is 1.2 milliliters per gram (mL/g) and the average pore radius is 170 Å and the particle size>250 microns (μm). Table 1 infra has surface areas and pore volumes for three polymer-immobilized amine-based sorbents using PMMA.

An increased DBU to PMMA ratio in a polymer-immobilized DBU-based-sorbent results in increasingly smaller surface areas and pore volumes, and increasingly larger $CO_2$ loading capability. A suitable DBU:PMMA ratio is selected from between 2.5:1 and 5:1.

Both classes of sorbents can be used in the temperature range from 20° C. to 100° C.

The temperature range is suitable even for the immobilized amine-based sorbents inasmuch the amines used therein have high melting and boiling points, e.g., N-(2-hydroxyethyl) piperazine, b. p. 240° C.$^{760}$; DBU, b. p. 115° C.$^{11}$ (80° C. to 83° C. at 0.6 mm Hg) and a flash point of 110° C.; and TBD, m. p. 125° C.-130° C. These moieties have very low vapor pressures under normal barometric conditions. Other tertiary amines such as the imines, amidines, and guanidines typically have high molecular weights and hydrogen bonding which in turn yield high boiling points and concomitant low vapor pressures. This minimizes vaporization of amines from the immobilized amine-based sorbents as discussed infra and as demonstrated in Table 2 infra via X-ray photoelectron spectroscopy (XPS) analyses.

TABLE 1

Performance of PMMA/DBU Immobilized Sorbents at 25° C.

| Sorbent | Wt. Ratio PMMA/DBU | Surface Area ($m^2/g$) | Pore Volume mL/g | Mole $CO_2$ Adsorbed/Kg Sorbent[1] |
|---|---|---|---|---|
| Diaion ® HP@MG[2] | NA | 5.79 | 1.12 | 0.0 |
| Sorbent 13[3] | 10 | 369 | 1.10 | 2.082 |
| Sorbent 11[3] | 5 | 207 | 0.84 | 2.414 |
| Sorbent 12[3] | 2.5 | 94 | 0.58 | 3.024 |

[1]The numbers in this column are averages over as many four runs or three regenerations of the sorbent by heating at 90° C.
[2]Dialon ® HPM2G Poly methyl(methylacrylate) Bead - PMMA
[3]The sorbent numbers refer to Table 2 infra.

Polymer Bound Sorbent Detail

As for the polymer-bound sorbents, the amine is directly chemically bonded to a polymeric support substrate. The amine is selected from the group consisting of acyclic imines, cyclic imines, acyclic amidines, cyclic amidines, acyclic guanidines, and cyclic guanidines.

Figure 3:
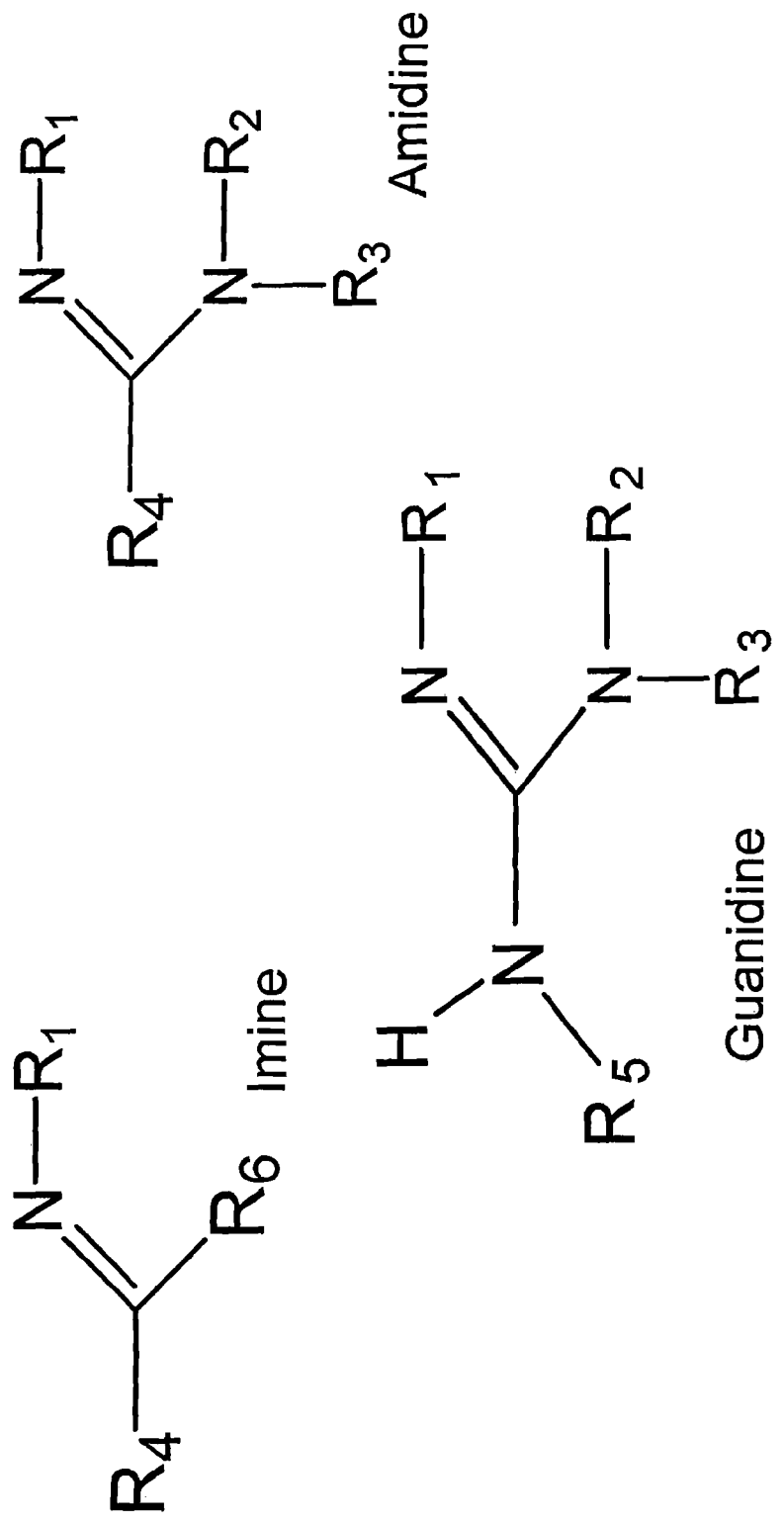
FIG. 3 is a schematic diagram of the general structures of imines, amidines, and guanidines.

Imines, amidines, and guanidines, can serve well as tertiary amine sorbents with a high molar adsorption ratio (1:1), as does DBU, for $CO_2$. The structures given in FIG. 3 for imines, amidines, and guanidines are general with R therein being alkyl, aryl, alkyloxy, and/or acryloxy moieties. Imines are analogues of aldehydes or ketones, having NR doubly bonded to carbon. Amidines are derivatives of carboxylic acids in which the hydroxyl functionality is replaced by an amino functionality and the oxo functionality is replaced by =NR. Guanidines share a common functionality with the general structure $(R_1R_2N)(R_3R_4N)C=N-R$. The parent moiety itself has the formula $C(NH_2)_3$ wherein a Lewis structure provides a carbon to nitrogen double bond (C=N).

FIG. 4 conceptualizes the preparation of the two classes of amine-based sorbents. In the left column of FIG. 4, i.e. FIG. 4A, the amine is placed into the pores of a polymeric substrate so as to create polymer-immobilized amines. In FIG. 4B, an amine is depicted bound to a monomer via a chemical reaction to create an amine-functional monomer or as referred to herein, a polymer-bound sorbent whereby the amine is bound to the exterior surface of the polymer. Finally, in the right-hand column, i.e. FIG. 4C, the amine-functional monomer is depicted as polymerized to form a construct comprising a plurality of monomers.

The sorbents can be formed into a solid phase selected from the group consisting of extrudates, films, powders, pellets, or monoliths to accommodate various reactor configurations.

The polymer-bound amine-based sorbents can be used in the pressure range from of about 5 Torr to 5 atmospheres (atm).

Surprisingly and unexpectedly, inventors have also found that these sorbents are readily regenerable over a number of cycles by heating upwards to 100° C.

DBU Sorbent Detail

Immobilization of DBU and TBD in preexisting polymer substrates occurs VIA evaporation into substantive pores. Use of these sterically hindered amines gives a 1:1 molar ratio of amine to carbon dioxide, making these cost effective. The following reactant volumes and experimental parameters are for illustrative purposes only and are empirically determined. As such, such exact values should not be construed as limiting the inventions.

Macronet MN-200 Polystyrene.

Suitable portions (e.g. 75 grams (g)) of Macronet MN-200 polystyrene beads (Purolite) were combined with a 1:1 liquid solution of DBU and methanol (30 g, 15 g, or 7.5 g of each/Sorbents 8 through 13 in Table 2 infra) and placed into a 1-liter pear-shaped round bottom flask. An additional 150 milliliters (mL) of methanol were added to the polystyrene-DBU-methanol slurry followed by rotation for 15 minutes (min) in a rotatory evaporator apparatus. The slurry was heated up to 90° C. and a vacuum pressure of from about 10 mm Hg to 300 mm Hg was applied to remove the excess methanol. The polystyrene-DBU solid amine sorbent was cooled to room temperature at atmospheric pressure.

Diaion HP-2MG Polymethylmethylacrylate (PMMA)

This preparation was carried out as given in U.S. Pat. No. 5,876,488 supra, which is hereby incorporated by reference.

The preparation of immobilized TBD-based sorbents is carried out in a similar manner.

DBU and TBD reacts with monomers to form DBU-functional polymers. Representative polymers include, but are not limited to, polystyrene, methylsiloxane, polyether, alkyl halide, acrylate, silicone, and combinations thereof.

Poly(6-Phenyl-DBU)styrene

Figure 5:
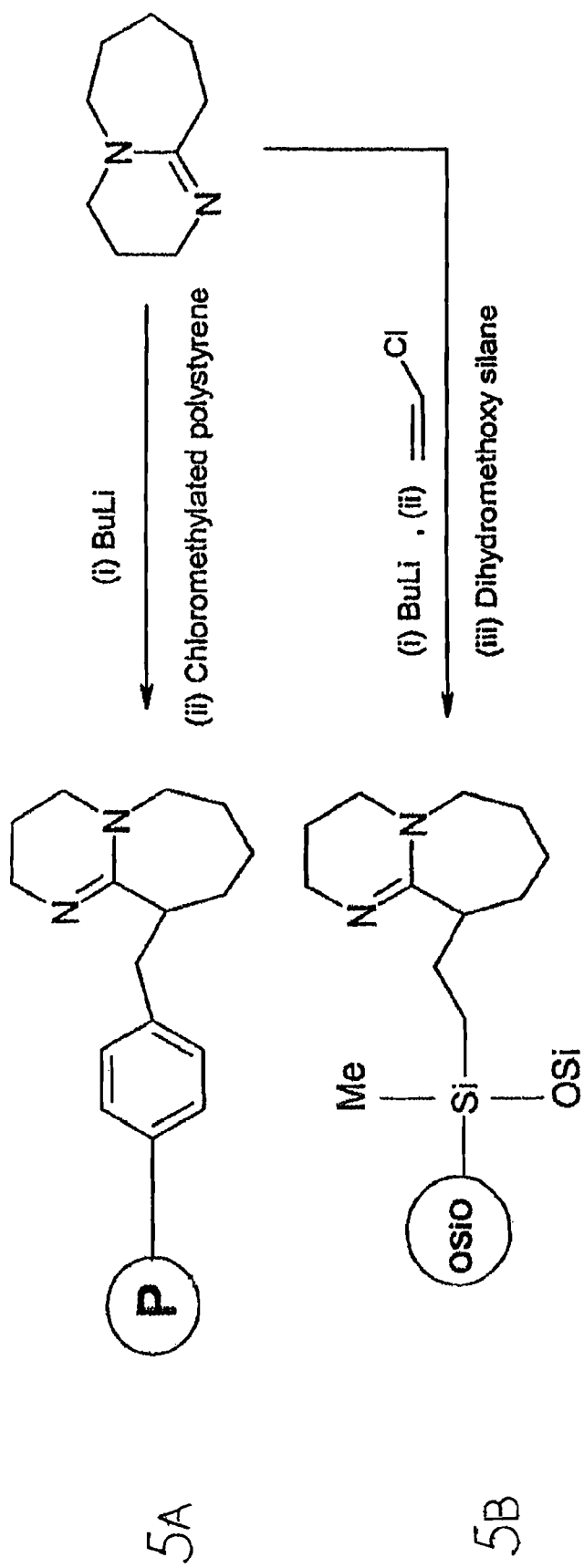
FIG. 5A is a schematic diagram of the reaction of 1,8-Diazabicyclo[5.4.0]undec-7-ene (DBU) with chloromethylated polystyrene to form a DBU-functional polystyrene, in accordance with features of the present invention.
FIG. 5B is a schematic diagram of the reaction of 1,8-diazabicyclo[5.4.0]undec-7-ene (DBU) with dihydromethoxy silane to form poly(6-ethyl-DBU) methylsiloxane, in accordance with features of the present invention.

FIG. 5A displays the overall reaction scheme for this moiety. Suitable amounts (e.g. 152 milligrams (mgs)) of DBU (1 millimole (mmol)) were dissolved in 25 mL of tetrahydrofuran (THF) under argon atmosphere at −78° C. The mixture was stirred well, and 1.0 mL (0.95 mmol) of titrated butyl lithium (BuLi) (in 1 Molar (M) hexane) was added over the course of 30 minutes. The solution was subsequently stirred for an additional 30 min while 1 mmol of chloromethylated polystyrene were added slowly. The temperature was allowed to rise to room temperature and stirring maintained for 3 hours (hrs). At the end of the reaction period, 2 mL of methanol were added to the reaction mixture. The mixture was concentrated under reduced pressure and purified in hexane.

Poly(6-Ethyl-DBU)methylsiloxane

FIG. 5B displays the overall reaction scheme for this moiety. 152 milligrams (mg) (1 millimole (mmol)) of DBU were dissolved in 25 mL of tetrahydrofuran (THF) under argon atmosphere at −78° C. The mixture was stirred well, and 1.0 mL (0.95 mmol) of titrated butyl lithium (BuLi) (in 1 Molar (M) hexane) was added over the course of 30 minutes. The solution was subsequently stirred for an additional 30 min while 62.5 mg (1 mmol) of vinyl chloride were added slowly. The temperature was allowed to rise to room temperature and stirring maintained for 3 hours (hrs). At the end of the reaction period, 2 mL of methanol were added to the reaction mixture. The mixture was concentrated under reduced pressure and purified via silica gel column. 6-Vinyl DBU was well separated using an ethyl acetate-hexane (1:5 mixture) at a yield of 171 mg or 96 mol %.

223 mg of 6-Vinyl DBU and 29 mg (0.0145 mmol) polyhydromethylsiloxane were dissolved in 30 mL THF and stirred overnight. Upon concentrating the mixture, a solid waxy material was obtained. The product was washed several times with both THF and methanol to give poly(6-ethyl-DBU) methylsiloxane. The product was dried under vacuum at a yield of 247 mg or 98 mol %.

Poly(1-carboxy-6-ethyl-DBU)methylsiloxane 1.25 g of poly(6-ethyl-DBU)methylsiloxane supra were placed in a beaker and exposed to $CO_2$ at one atmosphere (atm) at room temperature. After 10 to 15 minutes of exposure to $CO_2$, the resultant product was weighed, showing a new mass of 1.51 g, or a 98 mol % yield of a 1:1 $CO_2$ to DBU adduct. This product was used in thermogravimetric analysis (TGA) to confirm the amine to $CO_2$ 1:1 molar ratio, FIG. 4 infra. This method was also utilized for preparation of polystyrene-supported DBU-$CO_2$.

DBU-Functional Polyether.

DBU (Aldrich) is dissolved in dry THF, and the temperature lowered to −78° C. using a dry ice-acetone bath. At that point, an equimolar amount of BuLi (1M in THF) is added to the DBU solution and stirred for 30 min at −78° C. Subsequently, a solution of polyepichlorohydrin-co-ethylene oxide (Aldrich) in THF is added (equimolar concentrations of DBU and epichlorohydrin), and the solution stirred for 30 minutes at −78° C. The cold bath is then removed, and the solution allowed to come to room temperature while maintaining stirring. The THF is removed under vacuum, and the product redissolved in water. The resultant polymer is separated from the lithium chloride (LiCl) byproduct by dialysis, and subsequently recovered by removal of the water under vacuum. This process can be used with any variety of epichlorohydrin homopolymer or copolymer with other alkylene oxides.

Alkyl-Functional DBU

DBU (Aldrich) is dissolved in dry THF, and the temperature lowered to −78° C. using a dry ice/acetone bath. An equimolar amount of BuLi (1M in THF) is added to the DBU solution and stirred at −78° C. for 30 minutes. Subsequently, a solution of an alkyl bromide, e.g., dodecyl bromide (equimolar with the DBU), is added and the mixture stirred at −78° C. for another 30 minutes. The cold bath is removed and the solution allowed to come to room temperature while stirring. The THF is removed under vacuum, and the product redissolved in hexane. The resulting slurry is centrifuged, and the supernatant removed by decantation, and filtered. The hexane is removed leaving the product.

DBU-Functional Acrylate Monomer.

A DBU, THF, and BuLi solution is prepared as done supra with the solution stirred for 30 minutes after the addition of the BuLi. Subsequently, dimethyl t-butyl silyl-2-bromoethyl ether is added (equimolar amount). The mixture is stirred for 30 minutes, the cold bath removed, and the mixture warmed to room temperature. The silyl group is then cleaved using tetrabutyl ammonium fluoride, and the product purified using column chromatography, thus generating hydroxylethyl DBU. This moiety is subsequently reacted with acryloyl chloride at 0° C. with excess triethyl amine, generating the DBU-functional acrylate.

DBU-Functional Silicone.

A DBU, THF, and BuLi solution is treated as before. Subsequently, an equimolar amount (to DBU) of allyl chloride is added, and the mixture stirred for 30 minutes. The cold bath is removed and the mixture allowed to warm to room temperature. The THF and residual allyl chloride are removed under vacuum. The lithium chloride (LiCl) is removed in a subsequent step. Polyhydromethyl siloxane (Gelest) is dissolved in THF, and an equimolar amount of the allyl-DBU is added. Finally, a catalytic amount of chloroplatinic acid is added and the mixture heated to reflux for 12 hrs. Upon completion of the reaction, as shown by the disappearance of the Si—H peak in either the IR or NMR spectrum, the mixture is cooled and the catalyst residue is removed by filtration. The polymer is precipitated into a non-solvent (water or methanol) to remove unreacted DBU, and dried under vacuum.

All of the aforementioned synthetic schemes can be carried out in a similar manner with TBD.

TGA Analysis of poly(1-carboxy-6-ethyl-DBU)methylsiloxane

Figure 6:
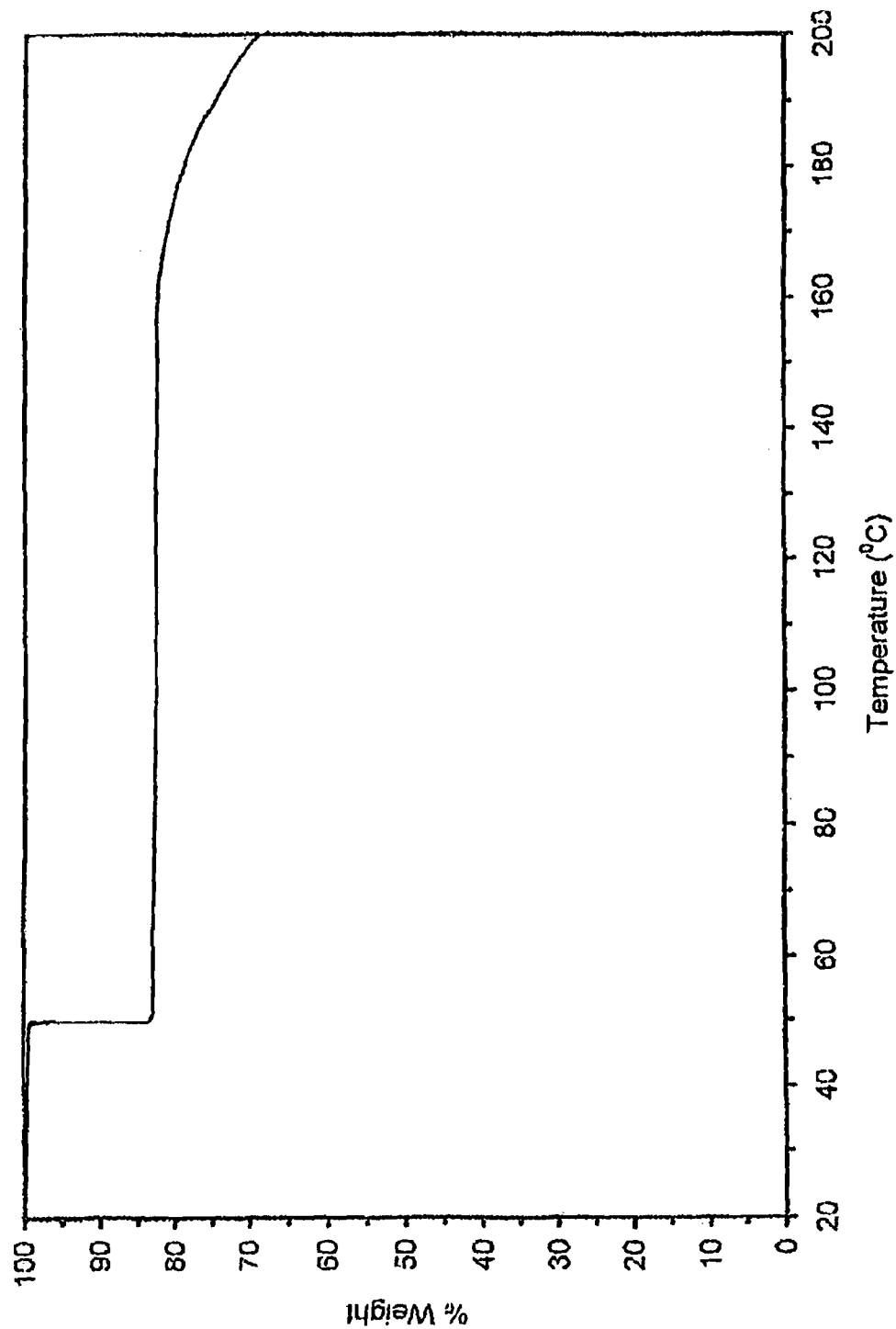
FIG. 6 is a plot of % weight as a function of temperature (° C.) of a TGA analysis of poly (1-carboxy-6-ethyl-DBU) methylsiloxane, in accordance with features of the present invention.

Initially, poly(1-carboxy-6-ethyl-DBU)methylsiloxane (as prepared supra) was analyzed via TGA. A rapid drop in weight due to desorption of carbon dioxide of approximately 17.5% (17.24% theoretical) occurred at 50° C. and is displayed in FIG. 6. This demonstrates a 1:1 $CO_2$ to DBU molar binding ratio. Similar results were obtained with DBU appended to a copolymer of styrene and chloromethyl styrene.

Bench Scale Carbon Dioxide Capture Reactor

Figure 7:
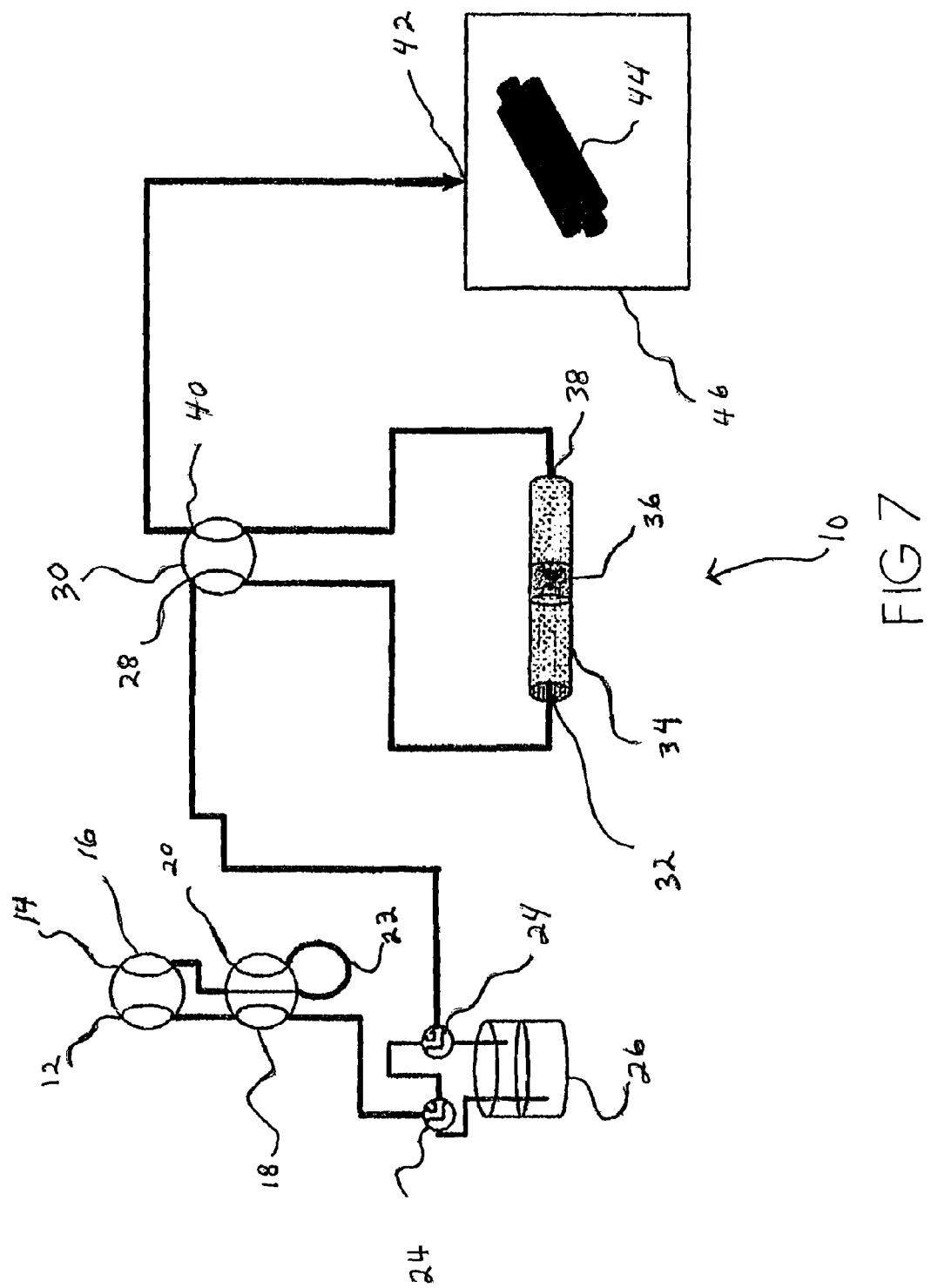
FIG. 7 is a schematic diagram of a bench scale carbon dioxide capture reactor, in accordance with features of the present invention.

FIG. 7 depicts a $CO_2$ capture capacity system designated as numeral 10. Gas streams 12 and 14 make ingress through a second 4-port valve 16. Control of the streams 12 and 14 is carried out by a 6-port valve 18 which can be used to allow egress 20 of either stream, if needed, through a loop 22. Such valves are available commercially from Brooks Instruments, Hatfield, Pa. Further control of the streams is managed by ingress and egress valves 24 for a water saturator 26. After either by-passing the water saturator 26 or going through it, the gas stream gains ingress 28 to a 4-port valve 30 and subsequently has ingress 32 to a reactor chamber 34. The reactor 34 is charged with an amine-based sorbent sample 36. The gas stream exits the reactor via the 4-port valve 30. Subsequent analysis, for example by a mass spectrometer, 44 is provided.

$CO_2$ Capture Capacity $CO_2$ capture capacities of the invented sorbents were determined by the combination of Temperature Programmed Desorption (TPD) and Mass Spectrometry (MS) analyses. An Ominostar mass spectrometer (Pfeiffer Vacuum, Nashua, N.H.) 44 was used for all MS analyses. Typically, the tubular reactor 34 was charged with a 1 g sample 36 of the sorbent and the sample pretreated with a 2% water/helium gas stream at a flow rate of 180 mL/min to 200 mL/min. The temperature was maintained at 25° C. under atmospheric pressure during this pretreatment period. This pretreatment period provides a means for creating an homogenous atmosphere with moisture present at a concentration necessary to facilitate the reaction of carbon dioxide with amine. (In one embodiment a moisture content of about 2 percent suffices.) Baseline conditions are also established during the pretreatment period.

After 30 minutes, the reactor 34 was by-passed and the reaction gas of 10% carbon dioxide/2% water/helium (He) was directed to the mass spectrometer 44 to form the baseline carbon dioxide concentration required for these tests. The gas flow was maintained at 160 mL/min to 170 mL/min over the capture temperature range of 25° C. to 85° C. at atmospheric pressure for the adsorption of carbon dioxide. The gas stream was subsequently switched to the reactor 34 and the amount of carbon dioxide captured by the sorbent was tracked by the mass spectrometer 44.

After approximately 35 minutes, the gas stream was switched back to the pretreatment conditions (He/2% $H_2O$ at 180 ml/min to 200 mL/min) and the reactor temperature was increased to 90° C. to start the desorption stage for the sorbent. After approximately 1.0 hr, the reactor 34 was cooled back to 25° C. completing the adsorption/desorption test. The breakthrough curves were generated by a excel spreadsheet and the areas of the adsorption curves were calculated by a linear integration method.

FIGS. 8 through 11 are plots of percent $CO_2$ concentration as a function of time. The mass spectrometer 44 measures the $CO_2$ content in the ingressing gas stream after the gas stream has passed over the sorbent in the reactor 34. A declining curve is a display of $CO_2$ sorption by the sorbent. An increasing curve displays $CO_2$ desorption from the sorbent.

Figure 8:
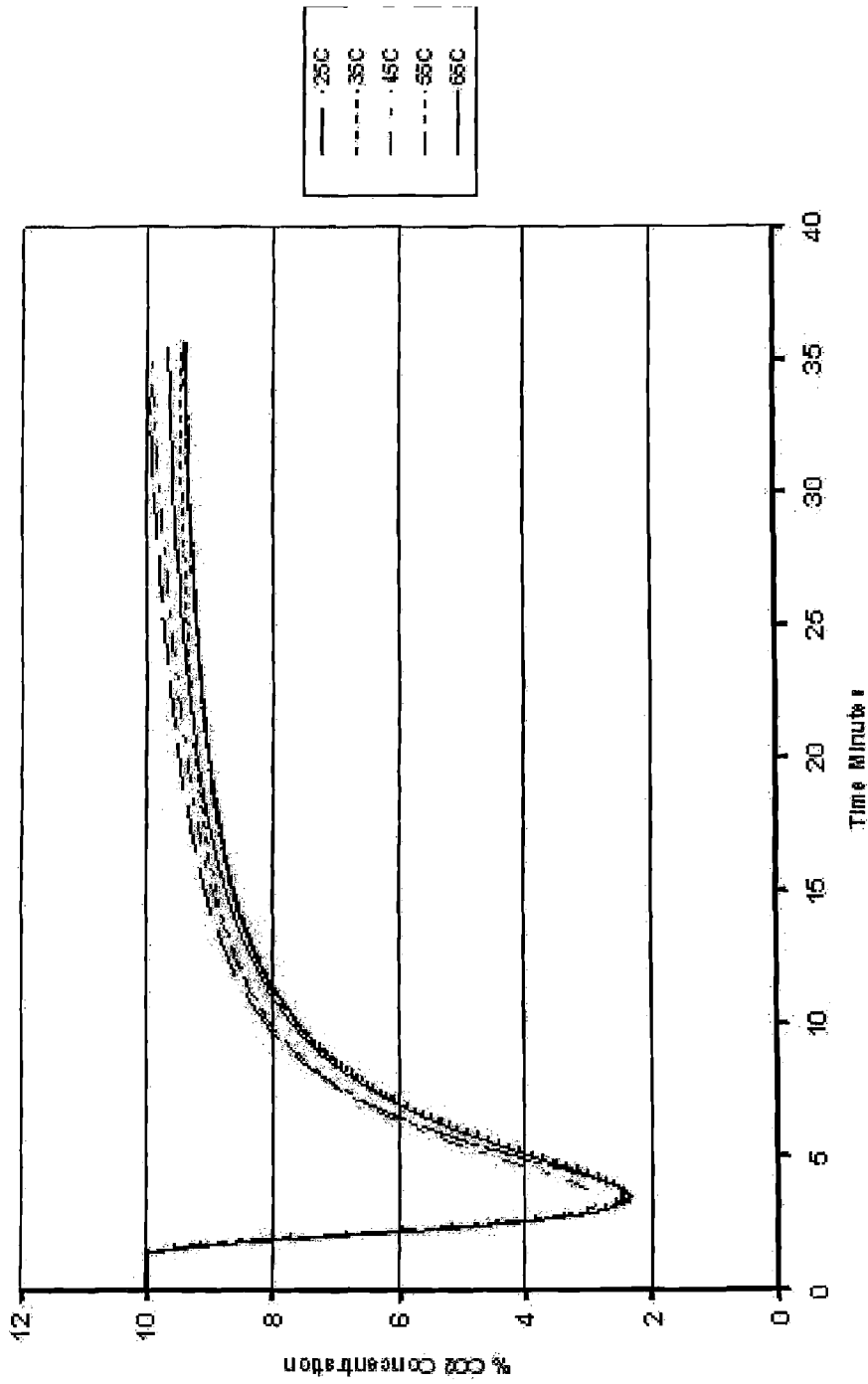
FIG. 8 displays a plot of the temperature effect of the capture of $CO_2$ as a function of time (min) for DBU chemically bound as part of a siloxane polymer. Carbon dioxide capture at four different temperatures (25° C., 45° C., 65° C., and 85° C.) is displayed, in accordance with features of the present invention.

FIG. 8 displays a plot of the temperature effect of the capture of $CO_2$ as a function of time (min) for DBU chemically bound as part of a siloxane polymer (Preparation B.2. supra, poly (6-ethyl-DBU) methylsiloxane; Sorbent No. 3, Table 2 infra). Carbon dioxide capture at four different temperatures (25° C., 35° C., 45° C., 55° C., and 65° C.) for sorption cycles four through eight (after regenerations 3 through 7) is displayed. Rapid Adsorption started at t=0 through to about t=7. After equilibrium is established (from t=15 to t=30), desorption starts at approximately t=35 min. The results are consistent over the four cycles with the $CO_2$ loading capacity of the amine sorbent remaining unchanged.

Figure 9:
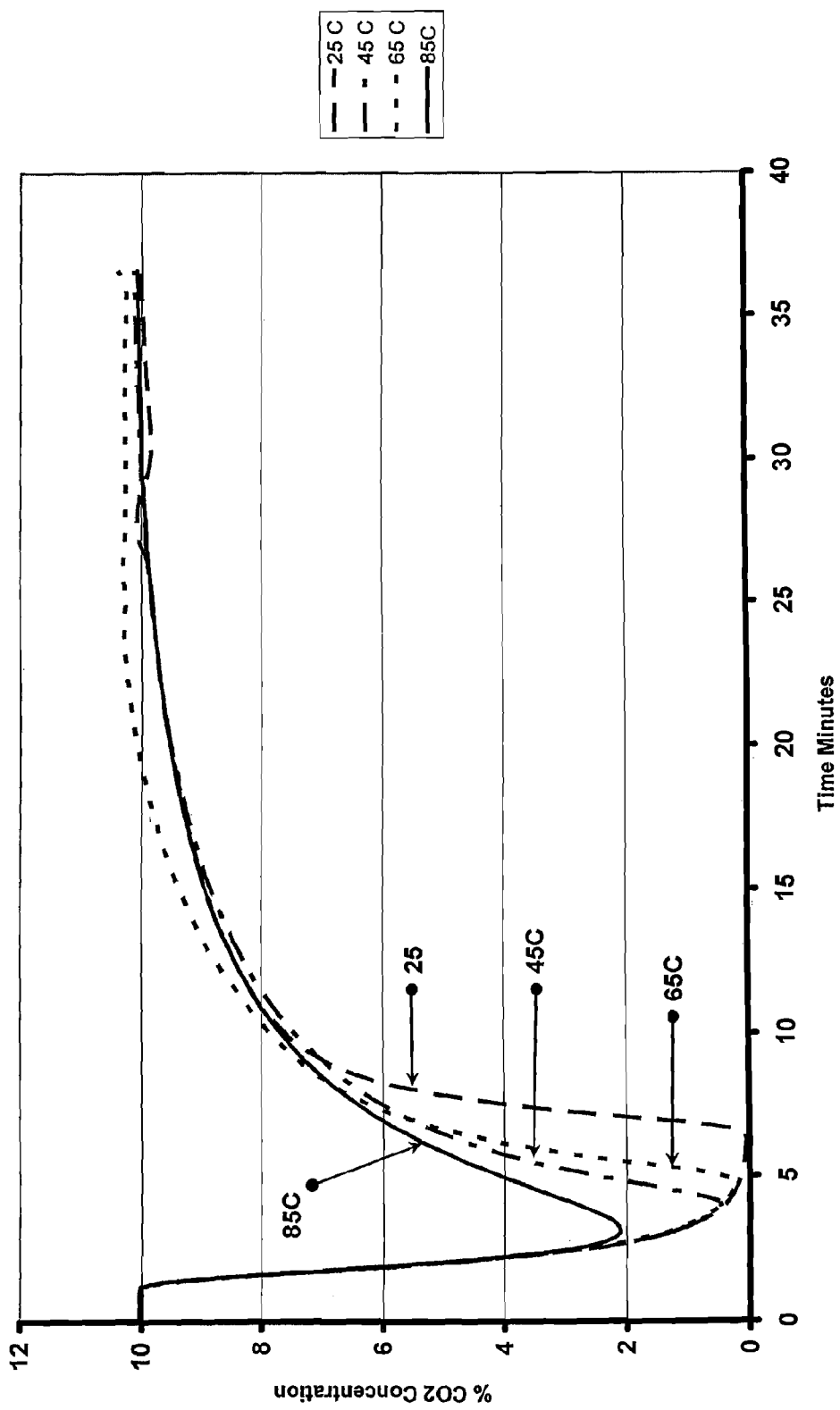
FIG. 9 displays a plot of the temperature effect of the capture of $CO_2$ as a function of time (min) by DBU immobilized in polystyrene bead Macronet MN-200. Carbon dioxide capture at four different temperatures (25° C., 45° C., 65° C., and 85° C.) is displayed, in accordance with features of the present invention.

FIG. 9 displays a plot of the temperature effect of the capture of $CO_2$ as a function of time (min) by DBU immobilized in polystyrene bead Macronet MN-200. (Preparation A.1. infra; Sorbent No. 8, Tables 1 and 2 infra). Carbon dioxide capture at four different temperatures (25° C., 45° C., 65° C., and 85° C.) is displayed. The start of adsorption and desorption are similar to FIG. 8, and the loading capability is similar for the four sorption temperatures. However, desorption is more marked after t=40. Generally, completion of the adsorption phase occurs when the carbon dioxide concentration returns to about 95 percent of its initial 10 percent concentration level.

Figure 10:
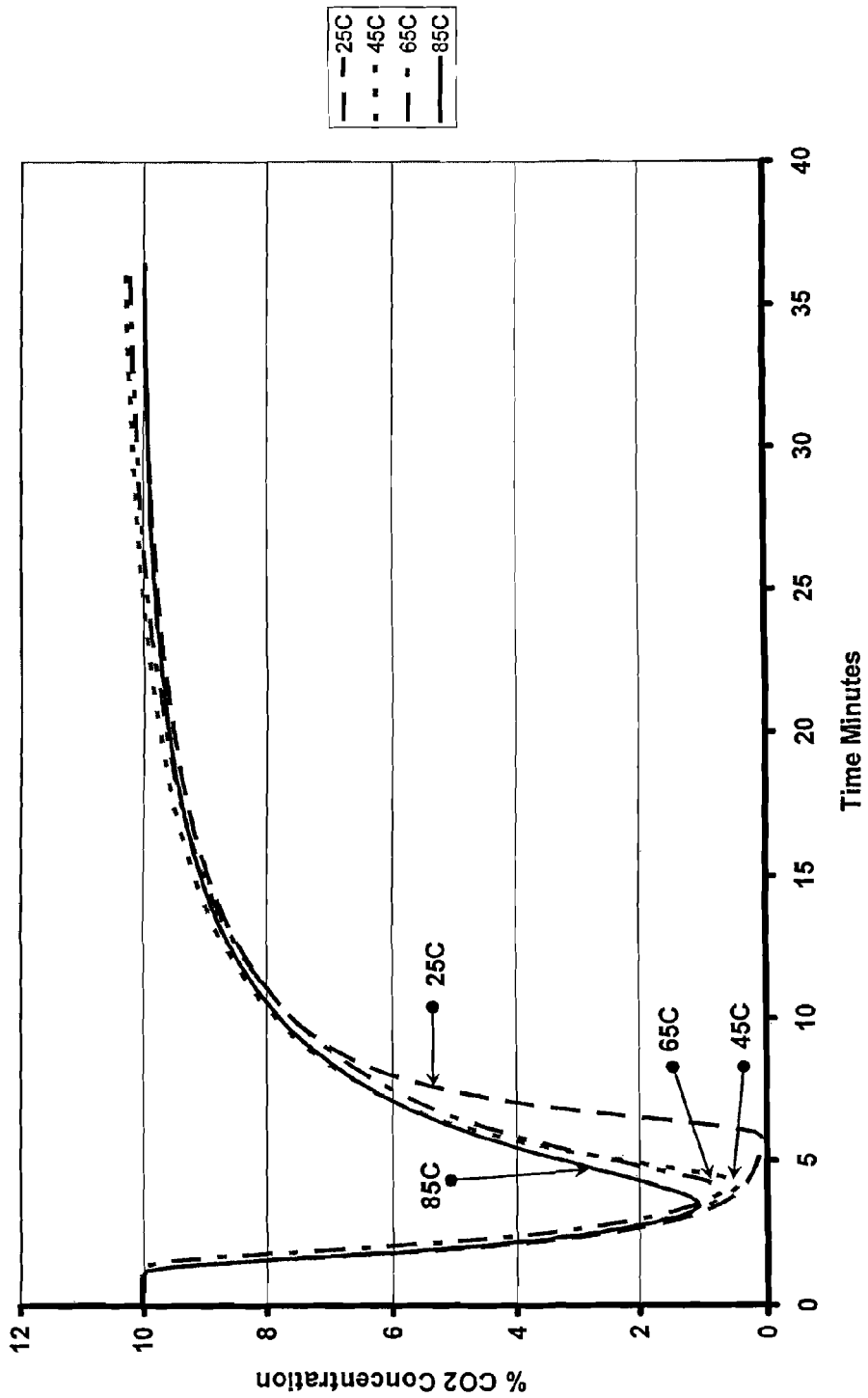
FIG. 10 displays a plot of the TPD mass spectra adsorption and desorption breakthrough curves as a function of time (min) over three regeneration cycles for DBU immobilized in Dialon®HPM2G-PMMA, in accordance with features of the present invention.

FIG. 10 displays a plot of the TPD mass spectra adsorption and desorption breakthrough curves as a function of time (min) over three regeneration cycles for DBU immobilized in Dialon®HPM2G-PMMA (Preparation A.2. infra; Sorbent No. 11, Table 2 infra). The start of adsorption and desorption are similar to FIGS. 8 and 9, and the loading capability is similar for the four sorption temperatures.

Figure 11:
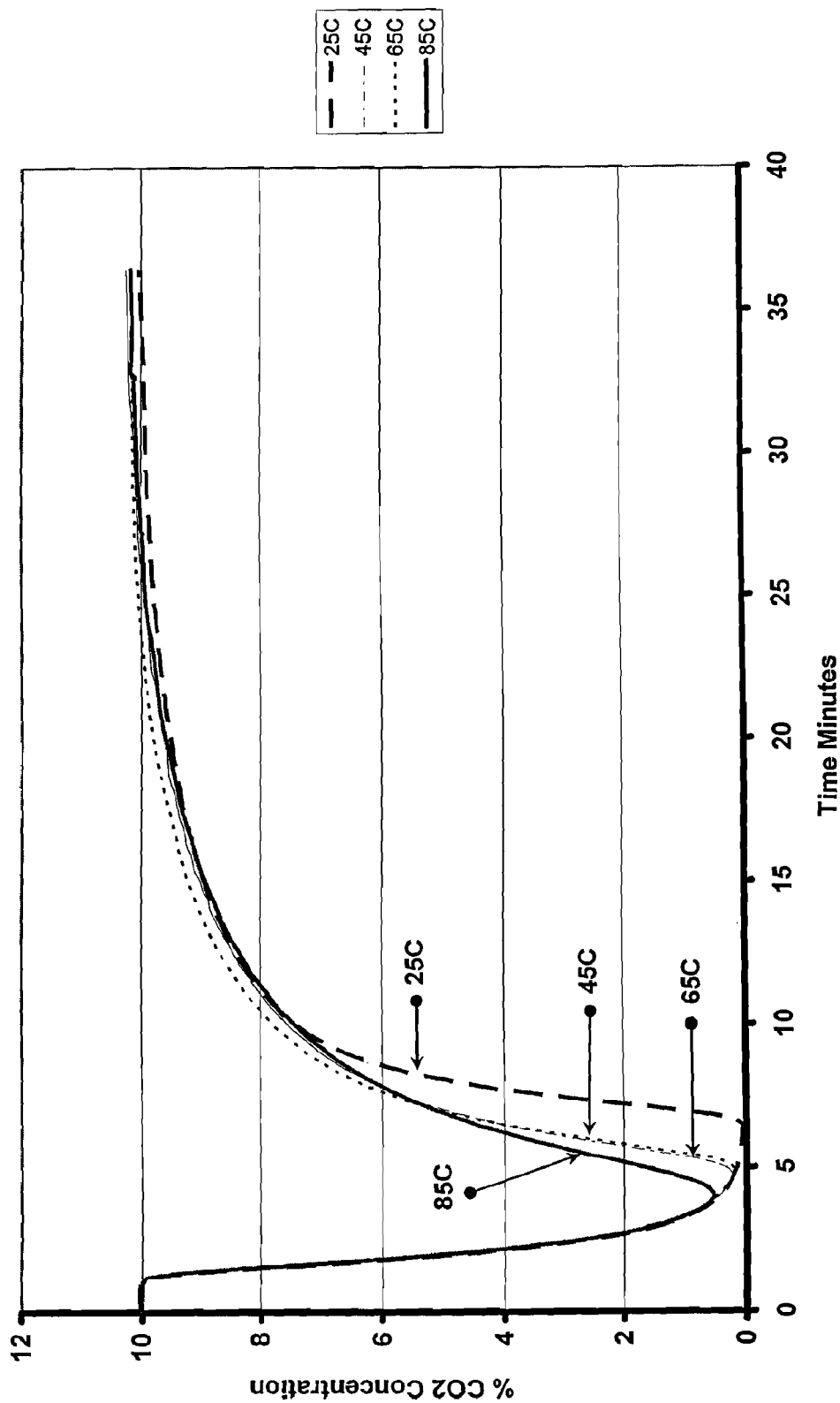
FIG. 11 displays a plot of the TPD mass spectra adsorption and desorption breakthrough curves as a function of time (min) over three regeneration cycles for DBU immobilized in Dialon®HPM2G-PMMA, in accordance with features of the present invention.

FIG. 11 displays a plot of the TPD mass spectra adsorption and desorption breakthrough curves as a function of time (min) over three regeneration cycles for DBU immobilized in Dialon®HPM2G-PMMA (Preparation A.2. infra; Sorbent No. 12, Table 2 infra). The start of adsorption and desorption are similar to FIGS. 8, 9, and 10, and the loading capability is similar for the four sorption temperatures.

XPS Analysis

The percent nitrogen (N1s Peak) attributable to the amine on the surface of the aminated sorbent was determined by XPS analysis. X-ray photoelectron spectroscopy (XPS) measurements were carried out with a PHI 5600ci ESCA instrument (Physical Electronics USA, Chanhassen, Minn.) using monochromatic Al Kα x-rays. The pass energy of the analyzer was 58.7 electron volts (eV) for high-resolution scans. Relative elemental concentrations on the surface of the sorbents were calculated by measuring peak areas in the high-resolution spectra and then converting to atomic concentrations using instrument manufacturer-provided sensitivity factors. The relative elemental concentration for N is given in Table 2 infra as XPS N1s.

Under these conditions the levels of N contained in the chemically attached amines can be determined for each of the $CO_2$ capture sorbents. XPS analyses carried out before and after use of an amine-based sorbent reveal the extent of retention of the amine, especially for the immobilized amine-based sorbents, wherein the amines are contained within the pores of the polymeric support material and therefore below the surface of the polymer. The XPS N1s values thus measure the thermal stability of the immobilized amine-based sorbents.

For example, sorbent 11 (15 g of DBU in 75 g of PMMA) has an XPS N1S value of 0.9 before any usage. After four cycles of adsorption/desorption at 25° C., one cycle of adsorption/desorption at 45° C., and one adsorption/desorption cycle at 65° C., the XPS N1s value is 1.0. Over the course of six cycles including two at elevated temperatures, the DBU remained within the pores of the PMMA demonstrating the thermal stability of this sorbent. In general, this is true for all of the XPS N1s sets of values shown infra.

The thermal stability of the immobilized amine-base sorbents is due in large part to the amines' high boiling points as discussed supra.

Table 2 displays masses, temperatures, XPS, and $CO_2$ adsorption data for 13 different amine-based sorbents. Sorbents 1 through 2 and 8 through 13 are polymer-immobilized, and sorbents 3 through 7 are polymer-bound. For some of the polymer-immobilized sorbents, the mass ratios of polymer to amine are given. The XPS values give a relative measure of the nitrogen content of the sorbents. Each XPS entry was obtained before the sorption data in the same row. The mols of $CO_2$ adsorbed per Kg of sorbent are given for previously unused sorbent and sorbent which has been regenerated by heating to 90° C.

According to Table 2, the new immobilized and chemically bound amine-based sorbents have $CO_2$ capture capacities of 2.9 to 5.7 mol of $CO_2$ per kilogram of sorbent and are thermally stable over as many as six test runs. The XPS N1s values indicate that the losses of nitrogen are minimal. Since the XPS N1s values are very similar before and after regeneration cycles, the amine functionality was not lost during the course of these tests.

These regenerable solid amine sorbents can capture carbon dioxide in a temperature range from of about 20° C. to 85° C. The capture of carbon dioxide at these elevated temperatures can create potential applications in flue gas stream clean-up since the exit temperature of Selective Catalytic Reduction (SCR) and Wet Flue Gas Desulfurization (FGD) scrubbing systems is in the range of from about 50° C. to 70° C.

In summary, the invented sorbents adsorb acid anhydrides at a molar ratio of 1:1 (amine to anhydride). The sorbents are thermally stable (little or no loss of amine) from 20° C. upwards of 100° C.

One class of sorbents employs tertiary amines, which are immobilized (polymer-immobilized) via evaporation into the pores of polymeric substrates. The second class of sorbents employs tertiary amines, imines, amidines, and guanidines, which are chemically bonded (polymer-bound) to polymeric substrates.

TABLE 2

Characteristics of Amine-Based Sorbents

| Sorbent/Temperature | Chemical Type | Support | XPS N1s | Moles of CO2 Adsorbed/Kg Sorbent | | | | |
|---|---|---|---|---|---|---|---|---|
| | | | | Fresh | 1st Reg | 2nd Reg | 3rd Reg | Average |
| 143A/25 C. | 1-(2-hydroxyethyl) Piperazine/PMMA | Diaion ®HP2MG | 1.68 | 3.4882 | 2.6841 | 2.6031 | 2.7397 | 2.8788 |
| 144A/25 C. | 1-(2-hydroxyethyl) Piperazine/PMMA | Macronet MW-200 | 5.92 | 2.7814 | 2.836 | 2.4421 | 2.791 | 2.7126 |
| 153A/25 C. | DBU Tertiary Amine | Silica | 4.2 | 1.7472 | 1.9915 | 2.0176 | 2.15082 | 1.9768 |
| 153A/35 C. | DBU Tertiary Amine | Silica | NA | 2.4778 | NA | NA | NA | |
| 153A/45 C. | DBU Tertiary Amine | Silica | NA | 2.2283 | NA | NA | NA | |
| 153A/55 C. | DBU Tertiary Amine | Silica | NA | 2.7875 | NA | NA | NA | |
| 153A/65 C. | DBU Tertiary Amine | Silica | 4 | 2.6065 | NA | NA | NA | |
| 156A/25 C. | DBU Tertiary Amine | Silica | 4.97 | 2.3009 | 2.6787 | 2.932642 | 1.51934 | 2.3579 |
| 162B/25 C. | Polyimide TBD | Silica | 5.4 | 2.4985 | 2.5289 | 2.517 | 2.2968 | 2.4603 |
| 162B/65 C. | Polyimide TBD | Silica | 4.7 | 2.5457 | NA | NA | NA | |
| 162C | Polyimide TBD | Polystyrene | 5.9 | 2.2787 | 2.743 | 2.5372 | 2.5816 | 2.5351 |
| 162C Capture at 45 C. | Polyimide TBD | Polystyrene | NA | 2.5034 | NA | NA | NA | |
| 162C Capture at 65 C. | Polyimide TBD | Polystyrene | 5.7 | 1.9674 | NA | NA | NA | |
| 163A | DBU Tertiary Amine NETL 30 g | Macronet MW-200 | 4.38 | 2.1979 | 2.8538 | 2.718 | 2.9175 | 2.6718 |
| 163A Capture at 45 C. | DBU Tertiary Amine NETL | Macronet MW-200 | NA | 2.4119 | NA | NA | NA | |
| 163A Capture at 65 C. | DBU Tertiary Amine NETL | Macronet MW-200 | NA | 2.7593 | NA | NA | NA | |
| 163A Capture at 85 C. | DBU Tertiary Amine NETL | Macronet MW-200 | 4.95 | 2.1131 | NA | NA | NA | |
| 166A Capture | DBU Tertiary Amine NETL 15 g | Macronet MW-200 | 3.3 | 2.3603 | 2.5614 | 2.4919 | 2.5389 | 2.4881 |
| 166A Capture at 45 C. | DBU Tertiary Amine NETL | Macronet MW-201 | NA | 2.2331 | NA | NA | NA | |
| 166A Capture at 65 C. | DBU Tertiary Amine NETL | Macronet MW-202 | 2.8 | 2.0211 | NA | NA | NA | |
| 166B | DBU Tertiary Amine NETL 7.5 g | Macronet MW-203 | NA | 2.1343 | 2.2281 | 2.2911 | 2.2048 | 2.2146 |
| 166B Capture at 45 C. | DBU Tertiary Amine NETL | Macronet MW-204 | NA | 2.0384 | NA | NA | NA | |
| 166B Capture at 65 C. | DBU Tertiary Amine NETL | Macronet MW-205 | NA | 1.5747 | NA | NA | NA | |
| 169A Capture | NETL DBU/PMMA-15 g | Diaion ®HP2MG | 0.9 | 1.9803 | 2.7544 | 2.5968 | 2.3224 | 2.4135 |

TABLE 2-continued

Characteristics of Amine-Based Sorbents

| | | | | | Moles of CO2 Adsorbed/Kg Sorbent | | | |
|---|---|---|---|---|---|---|---|---|
| Sorbent/Temperature | Chemical Type | Support | XPS N1s | Fresh | 1st Reg | 2nd Reg | 3rd Reg | Average |
| 169A Capture at 45 C. | NETL DBU/PMMA | Diaion ®HP2MG | NA | 2.1384 | NA | NA | NA | |
| 169A Capture at 65 C. | NETL DBU/PMMA | Diaion ®HP2MG | 1 | 2.2002 | NA | NA | NA | |
| 169A Capture at 85 C. | NETL DBU/PMMA | Diaion ®HP2MG | 1 | 2.2133 | NA | NA | NA | |
| 169B | NETL DBU/PMMA 30 g | Diaion ®HP2MG | 1.03 | 3.4299 | 2.9002 | 2.8126 | 2.9525 | 3.0238 |
| 169B Capture at 45 C. | NETL DBU/PMMA | Diaion ®HP2MG | NA | 2.4748 | NA | NA | NA | |
| 169B Capture at 65 C. | NETL DBL/PMMA | Diaion ®HP2MG | 1.26 | 2.3461 | NA | NA | NA | |
| 169C | NETL DBU/PMMA 7.5 g | Diaion ®HP2MG | 0.499 | 2.4841 | 2.085 | 2.0232 | 1.7371 | 2.0824 |
| 169C Capture at 45 C. | NETL DBU/PMMA | Diaion ®HP2MG | NA | 1.3844 | NA | NA | NA | |
| 169C Capture at 65 C. | NETL DBU/PMMA | Diaion ®HP2MG | 0.499 | 1.5299 | NA | NA | NA | |

Both classes of sorbents can be used at temperatures well in excess of 25° C. The sorbents are readily regenerable by heating to release $CO_2$ and other acidanhydrides such as $SO_2$ and $NO_x$.

While the invention has been described with reference to details of the illustrated embodiments, these details are not intended to limit the scope of the invention as defined in the appended claims.

The embodiment of the invention in which an exclusive property or privilege is claimed is defined as follows:

1. A sorbent for acid anhydrides comprising:
   a) a support substrate selected from the group consisting of polyethers, polystyrenes, siloxanes, polyacrylates, and combinations thereof;
   b) a tertiary amine selected from the consisting of 1,8 Diazabicyclo-[5.4.0]-undec-7-ene (DBU); 1,3,4,6,7,8-Hexahydro-2H-pyrimido[1,2,-a]pyrimidine (TBD), and N-(2-Hydroxyethyl)piperazine immobilized within the pores of the substrate; and
   c) wherein a 1:1 molar ratio of said acid anhydrides to the tertiary amine defines the maximum sorbent loading capacity.

2. The sorbent as recited in claim 1 wherein the acid anhydride is a gas selected from the group consisting of $CO_2$, $SO_2$, and $NO_x$.

3. The sorbent as recited in claim 1 wherein the sorbent adsorbs said acid anhydrides in the temperature range from 20° C. to 85° C.

4. The sorbent as recited in claim 1 wherein the molar ratio of the support substrate to amine is between 2.5:1 and 5:1.

5. The sorbent as recited in claim 1 wherein the surface area of the sorbents range from 50 meters squared per gram ($m^2/g$) to 1000 $m^2/g$.

6. The sorbent as recited in claim 1 wherein the sorbents can be formed into a solid phase selected from the group consisting of extrudates, films, powders, pellets, or monoliths to accommodate various reactor configurations.

7. The sorbent as recited in claim 1 wherein the sorbent is regenerated by heating to at or above 90° C.

8. A sorbent for removing acid anhydrides from a flue gas stream comprising:
   a) a support substrate selected from the group consisting of polyethers, polystyrenes, siloxanes, polyacrylates, and combinations thereof;
   b) a tertiary amine selected from the consisting of acyclic imines, cyclic imines, acyclic amidines, cyclic amidines, acyclic guanidines, and cyclic guanidines immobilized within the pores; and,
   c) wherein a 1:1 molar ratio of said acid anhydrides to the tertiary amine defines the maximum sorbent loading capacity.

9. The sorbent as recited in claim 8 wherein the acid anhydride is a gas selected from the group consisting of $CO_2$, $SO_2$, and $NO_x$.

10. The sorbent as recited in claim 8 wherein the sorbent adsorbs acid anhydride in the temperature range from 20° C. to 85° C.

11. The sorbent as recited in claim 8 wherein the sorbent can be used in the pressure range from 5 Torr to 5 atmospheres (atm).

12. The sorbent as recited in claim 8 wherein the surface area of the sorbents ranges from of about 50 meters squared per gram ($m^2/g$) to 1000 $m^2/g$.

13. The sorbent as recited in claim 8 wherein the sorbents can be formed into a solid phase selected from the group of extrudates, films, powders, pellets, or monoliths to accommodate various configurations.

14. The sorbent as recited in claim 8 wherein the sorbent can be regenerated by heating to or above 90° C.

15. The sorbent of claim 1 wherein the amine is solid.

16. The sorbent of claim 1 wherein the amine has a boiling point above 100° C.

17. The sorbent of claim 1 wherein the sorbent retains the amine after exposure to anhydride.

* * * * *